United States Patent
Thizon et al.

(10) Patent No.: US 10,614,971 B2
(45) Date of Patent: Apr. 7, 2020

(54) SEALING DEVICE FOR A HUMAN-MACHINE DIALOGUE ELEMENT

(71) Applicant: Schneider Electric Industries SAS, Rueil-Malmaison (FR)

(72) Inventors: Patrice Thizon, Ruelle-sur-Touvre (FR); Brice Raffin, Segonzac (FR); Hugues Da Dalt, Champniers (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 16/108,754

(22) Filed: Aug. 22, 2018

(65) Prior Publication Data
US 2019/0088422 A1  Mar. 21, 2019

(30) Foreign Application Priority Data
Sep. 15, 2017  (FR) ...................................... 17 70966

(51) Int. Cl.
| | | |
|---|---|---|
| *H01H 3/12* | (2006.01) | |
| *H01H 13/14* | (2006.01) | |
| *H01H 13/06* | (2006.01) | |
| *F16J 15/06* | (2006.01) | |
| *G09F 7/18* | (2006.01) | |
| *G09F 7/00* | (2006.01) | |

(52) U.S. Cl.
CPC .............. *H01H 3/12* (2013.01); *F16J 15/061* (2013.01); *F16J 15/064* (2013.01); *G09F 7/00* (2013.01); *G09F 7/18* (2013.01); *H01H 13/06* (2013.01); *H01H 13/14* (2013.01)

(58) Field of Classification Search
CPC .... H01H 13/06; H01H 2223/002; H01H 9/04; H01H 13/86; H01H 2009/048; H01H 13/063; H01H 21/08; H01H 2221/044; H01H 2011/0081; H01H 2013/066; H01H 23/06
See application file for complete search history.

(56) References Cited

U.S. PATENT DOCUMENTS 4,088,855 A *  5/1978  Emery .................... H01H 1/242
                                                        200/16 A
5,313,731 A    5/1994  Falchi
(Continued)

FOREIGN PATENT DOCUMENTS

FR          2 583 567        12/1986

OTHER PUBLICATIONS

French Preliminary Search Report dated Jun. 6, 2018 in French Application 17 70966 filed on Sep. 15, 2017 (with English Translation of Categories of Cited Documents and Written Opinion).

*Primary Examiner* — Ahmed M Saeed
(74) *Attorney, Agent, or Firm* — Oblon, McClelland, Maier & Neustadt, L.L.P.

(57) ABSTRACT

A sealing device for a human-machine dialogue element intended to be fixed through a wall, the device including a seal formed in a ring around an axis, the seal including a first annular edge and a second annular edge. The second edge follows a path including a plurality of chicanes so as to form at least one concave part delimiting a bearing zone on one face of the seal and at least one convex part delimiting a disengagement zone on the face of the seal to circumvent a positioning element of the seal.

11 Claims, 7 Drawing Sheets

(56) References Cited

U.S. PATENT DOCUMENTS

| | | | | |
|---|---|---|---|---|
| 6,483,057 B1 | * | 11/2002 | Wu | ............... H01H 13/06 |
| | | | | 200/302.1 |
| 6,717,082 B1 | * | 4/2004 | Wu | ............... H01H 13/063 |
| | | | | 200/302.2 |
| 7,560,653 B1 | * | 7/2009 | Sage | ............... H01H 9/04 |
| | | | | 200/302.1 |
| 2012/0168288 A1 | | 7/2012 | Furrer | |
| 2014/0262712 A1 | * | 9/2014 | Chu | ............... H01H 13/06 |
| | | | | 200/302.2 |
| 2015/0014141 A1 | * | 1/2015 | Rao | ............... G06K 9/0002 |
| | | | | 200/600 |
| 2016/0217943 A1 | * | 7/2016 | Kim | ............... H01H 13/86 |
| 2017/0213660 A1 | * | 7/2017 | Kitahara | ............... H01H 9/04 |
| 2018/0183912 A1 | * | 6/2018 | Lim | ............... G06F 1/1652 |

\* cited by examiner

A-A

SEALING DEVICE FOR A HUMAN-MACHINE DIALOGUE ELEMENT

TECHNICAL FIELD OF THE INVENTION

The present invention relates to a human-machine dialogue element sealing device and to a human-machine dialogue assembly comprising said human-machine dialogue element and said sealing device. The human-machine dialogue assembly is also liable to integrate an identification device such as for example a label-holder.

PRIOR ART

Various human-machine dialogue elements are known in the industrial field, in the form of control and/or display elements.

In control elements, there are for example distinguished pushbuttons, rotating knobs, rotating knobs with a key and emergency stop buttons. These various elements are intended to generate a command in an electrical installation. There also exist display elements, more commonly termed indicator lamps, the function of which is simply to be lit to signal a particular operating status to the operator.

A human-machine dialogue element classically includes a body of tubular shape surmounted by a flange. The body of the human-machine dialogue element is made of plastic material or metal. A human-machine dialogue element of this type is intended to be fixed through a wall, such as for example the door of an electrical equipment cabinet. To fix a human-machine dialogue element of this kind, an opening of a standard diameter is produced through the wall. The tubular body of the human-machine dialogue element is inserted in said opening until its flange comes to abut against the wall, at the periphery of the opening. It therefore has a front part visible from one side of the wall and a rear part that is invisible, situated on the other side of the wall. Fixing means cooperating with its rear part enable it to be fixed through the opening.

In known manner, a seal of annular shape is threaded around the body as far as the flange of the button and in particular has a part intended to come to bear against the periphery of the opening formed through the wall so as to provide the seal around the opening, between the front and the rear of the wall.

Moreover, it is also known to mount an identification device on a human-machine dialogue element of this kind, enabling an operator rapidly to identify its function. A device of this kind is for example intended to carry a label or any other identification solution.

The identification device is often removable and must be able to be positioned on and adapted to any human-machine dialogue element. In general, it includes a circular opening intended to have the body of the button passed through it and the periphery of which is gripped between the wall and a shoulder formed by the flange of the human-machine dialogue element. To this end, the human-machine dialogue element includes a clearance between the exterior edge of its flange and the seal, enabling the identification device to be slid therein. However, when the human-machine dialogue element is mounted on the wall in the absence of the identification device, the clearance, which is then not filled in, becomes a place of deposition of diverse particles, notably dust.

The objective of the invention is therefore to propose a solution that makes it possible:

To employ a sealing device arranged directly between the human-machine dialogue element and the wall;

to position an identification device as defined hereinabove, without necessitating the presence of a clearance under the flange;

to use the same sealing device on the human-machine dialogue element, whether with or without identification device.

Some known human-machine dialogue elements have a so-called flush architecture in which the flange is of very low height, projecting only very little from the plane formed by the wall. The solution according to the invention will in particular be perfectly suited to this type of human-machine dialogue element, making it possible to preserve this flush architecture whilst fulfilling the objectives defined hereinabove.

STATEMENT OF INVENTION

The solution of the invention therefore consists in a sealing device for a human-machine dialogue element intended to be fixed through a wall, said device comprising a seal formed in a ring around an axis, said seal comprising:
 a first annular part comprising at least one positioning element of the seal adapted to cooperate with said human-machine dialogue element to limit the rotation of the seal about its axis,
 a sealing second annular part comprising a first face and a second face.

The device is characterized in that:
 the seal includes a first annular edge formed around said axis projecting from said first face and a second annular edge formed around said axis projecting from said second face,
 the second edge follows a path including a plurality of chicanes so as to form at least one concave part delimiting a bearing zone on said second face and at least one convex part delimiting a disengagement zone on said second face to circumvent said positioning element.

According to one particular feature of the device, said first annular part takes the form of a belt and in that said second annular part forms a flange around said belt.

According to another particular feature of the device, said belt includes an internal first face and an external second face and said positioning element includes a hollow formed in said internal face forming a protuberance on said external face.

According to another particular feature of the device, the first edge includes at least one chicane delimiting a disengagement zone on said first face to circumvent said positioning element.

The invention also concerns a human-machine dialogue assembly, comprising a human-machine dialogue element provided with a tubular body surmounted by a flange. This assembly is characterized in that it includes a sealing device as defined above in which said seal is adapted to surround said body of the human-machine dialogue element with its first annular part and to bear against the flange through said first edge.

According to one particular feature, this assembly includes an identification device comprising at least one tongue adapted to bear on said bearing zone of the first face.

According to another particular feature of the assembly, the identification device includes a first part having an opening arranged at the periphery of said flange of the human-machine dialogue element and a second part carrying said at least one tongue.

According to another particular feature of the assembly, the first part of the identification device includes a housing intended to receive an identification label.

According to another feature of the assembly, the first part includes a casing and the second part includes a plate assembled onto said casing.

According to another particular feature of the assembly, the plate includes a routed opening on the edge of which is formed said at least one tongue.

According to another particular feature of the assembly, the casing and the plate are assembled together by peening or overmoulding.

BRIEF DESCRIPTION OF THE FIGURES

Other features and advantages appear in the following detailed description with reference to the appended drawings in which.

DETAILED DESCRIPTION OF AT LEAST ONE EMBODIMENT

A main axis (X) is defined for the remainder of the description.

The terms upper, lower, front and rear are to be considered relative to this main axis (X), shown vertical in the figures, the axis being perpendicular to the fixing wall P.

The invention applies to a human-machine dialogue element. A sealing device is fitted to the human-machine dialogue element, forming a human-machine dialogue assembly. The human-machine dialogue assembly could also include an identification device.

By human-machine dialogue element is meant an element integrating a control function and/or a luminous signalling type function. In nonlimiting manner, it could thus be a pushbutton, a rotating knob, an emergency stop button or an indicator lamp.

Figure 1A:
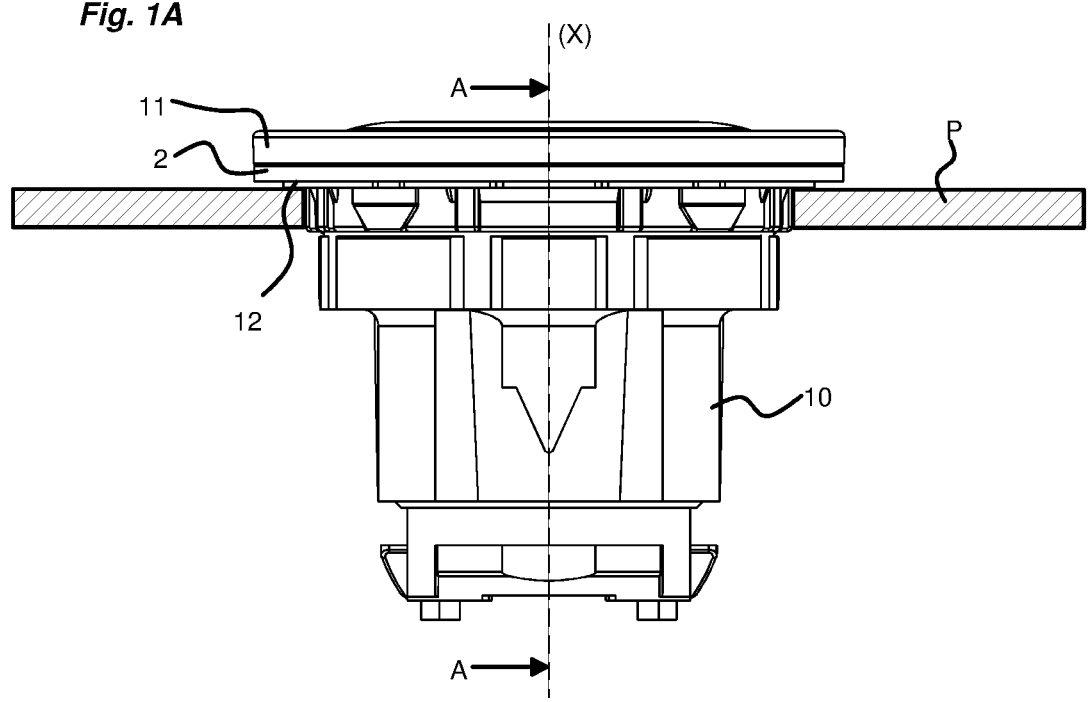
FIGS. 1A to 1C show a human-machine dialogue element of pushbutton type to which is fitted the sealing device of the invention, respectively from the side, in section taken along the line A-A, and in perspective.
Figure 1B:
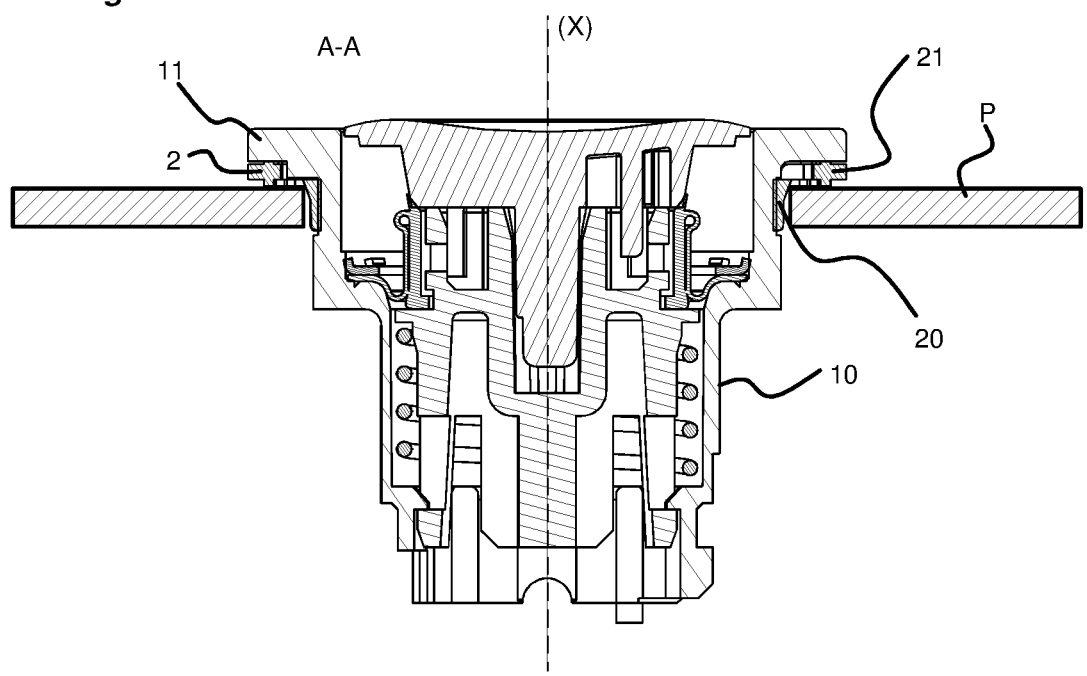
Figure 1C:
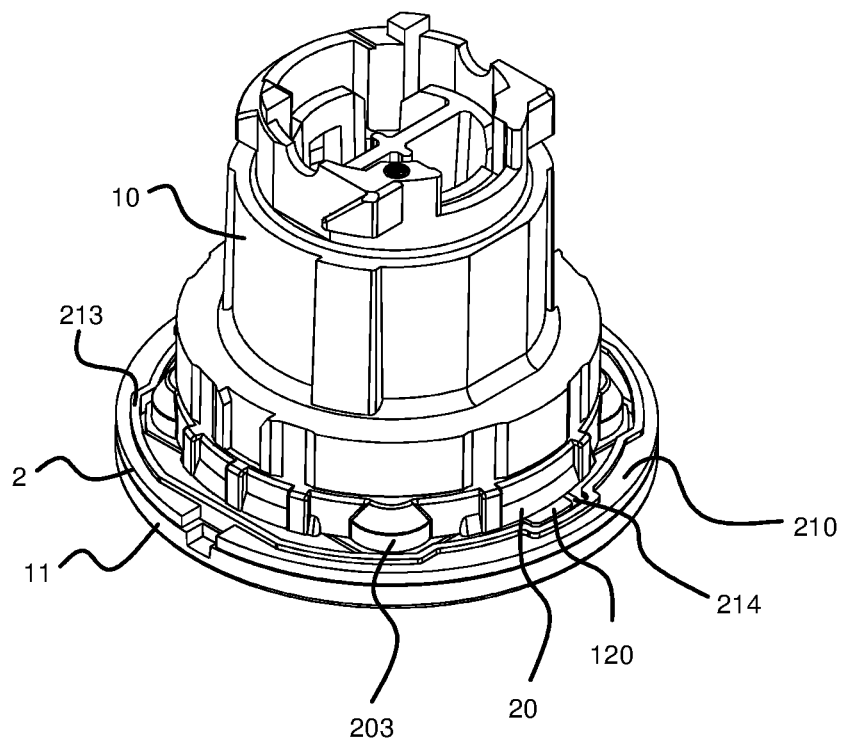
Figure 2A:
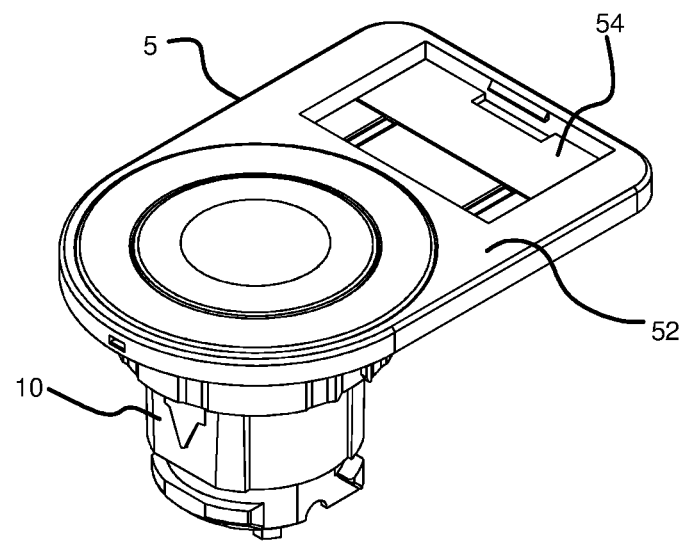
FIGS. 2A to 2F show a human-machine dialogue element of pushbutton type to which are fitted the sealing device of the invention and an identification device, respectively in perspective from above, in perspective from below, from above, in section taken along A-A, in section taken along B-B, in a detail view from FIG. 2E.
Figure 2B:
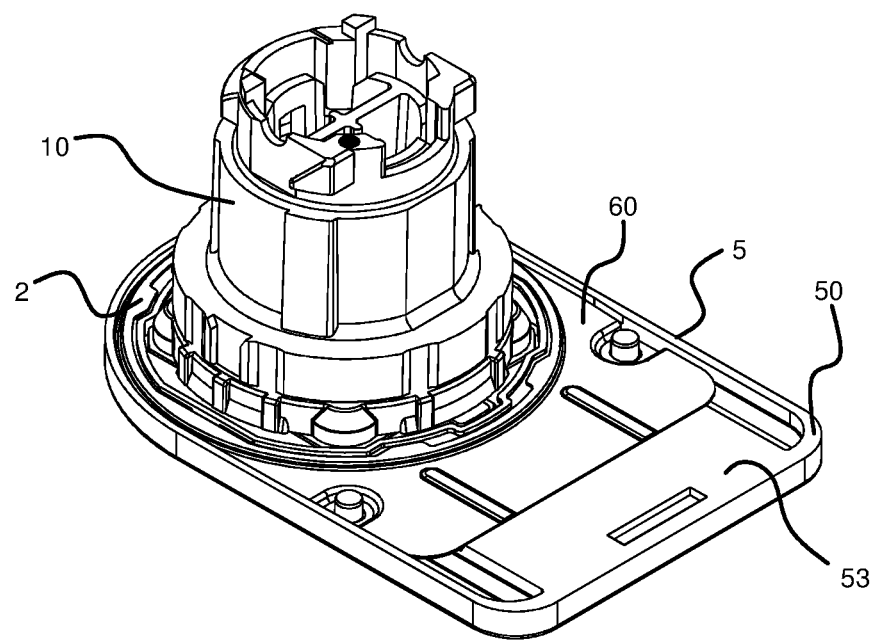
Figure 2C:
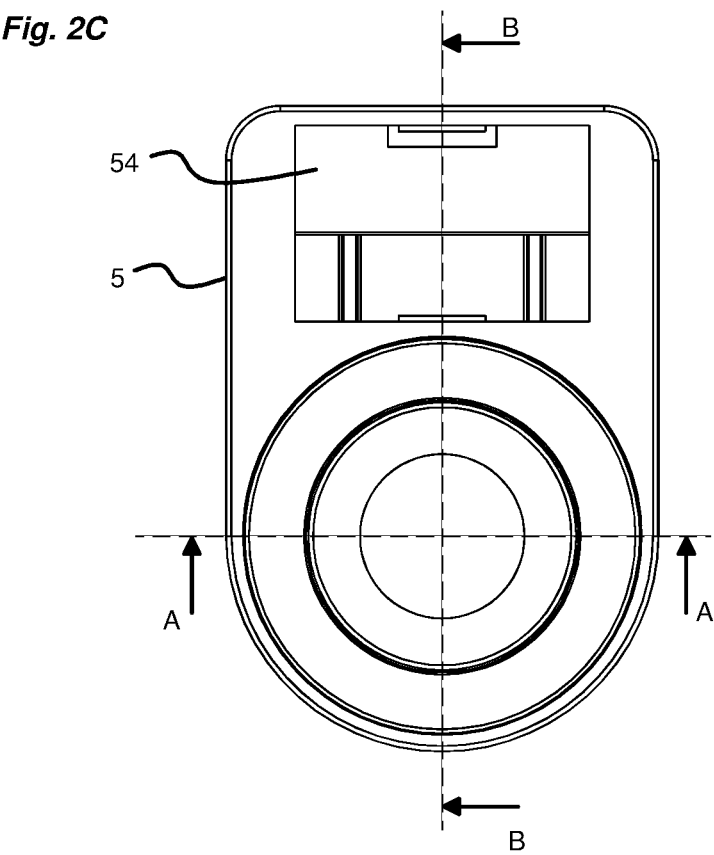
Figure 2D:
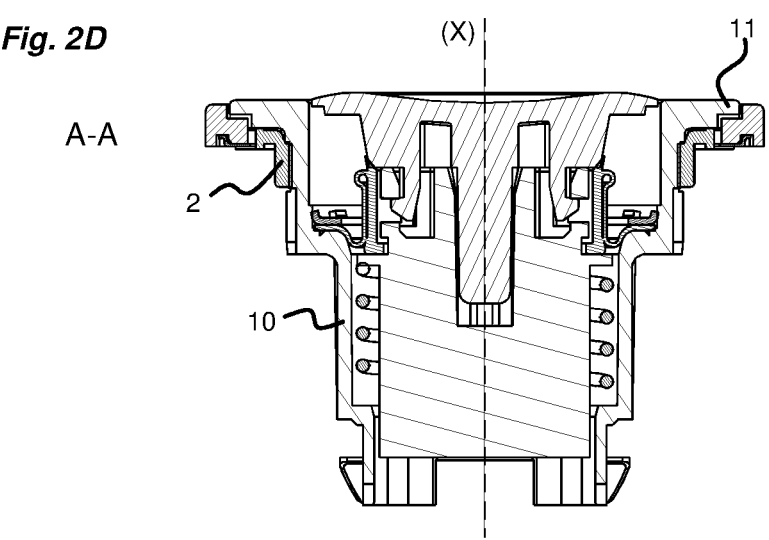
Figure 2E:
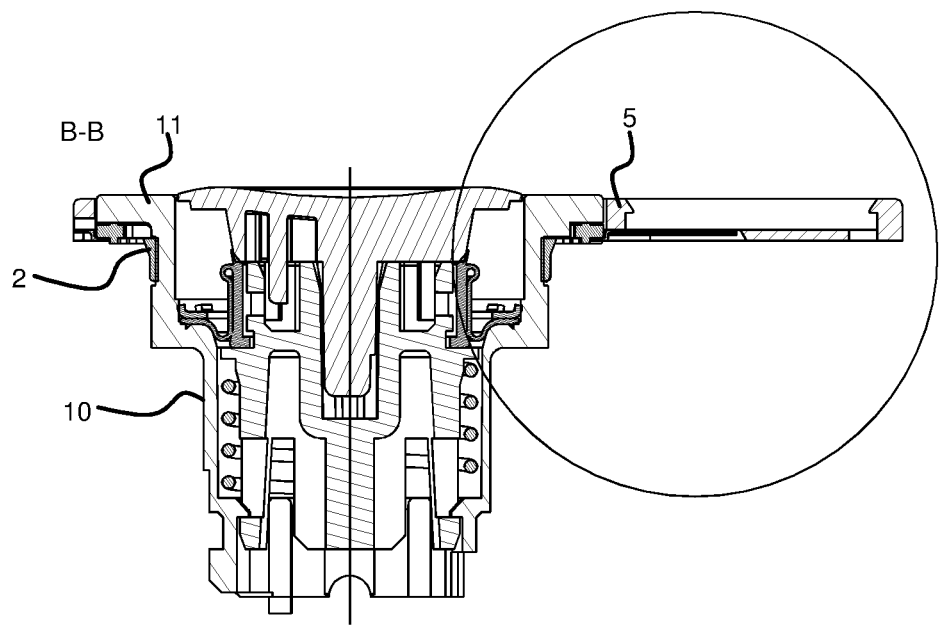
Figure 2F:
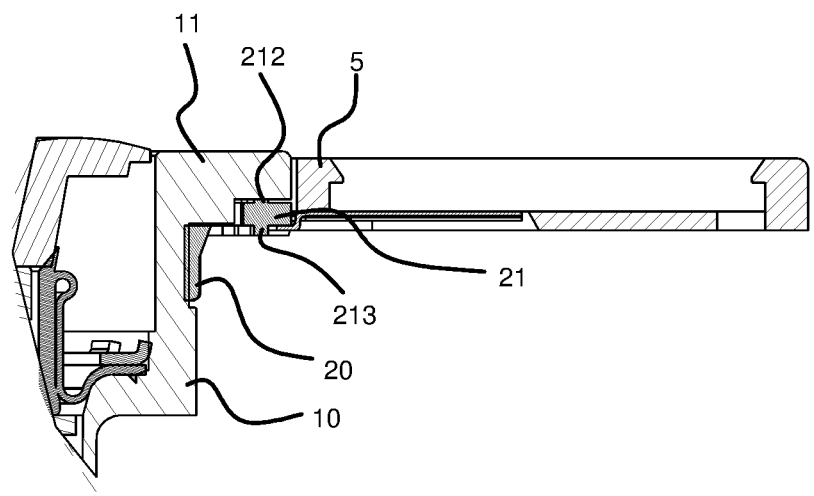

Referring to FIGS. 1A to 1C, a human-machine dialogue element includes a tubular body 10 formed along the axis (X) and a flange 11 surmounting said tubular body 10. Said flange therefore forms a shoulder 12 extending outward relative to the section of the tubular body. The flange 11 may carry a control button and/or a transparent cap for signalling. The tubular body may include an upper part, situated under the flange and a lower part, with two sections of different sizes.

The human-machine dialogue element is intended to be fixed through a wall P, for example the door of an electrical equipment cabinet. To this end, the wall includes a generally circular opening of standardized diameter (for example of 22 mm standardized diameter). The body 10 of the button is inserted in the opening as far as its flange 11, so that the body is situated toward the rear of the wall and the flange toward the front. Under the shoulder 12, a sealing device is positioned to produce the seal around the opening between the front and the rear of the wall.

The sealing device includes a seal 2 formed in a ring and threaded axially around the upper part of the body of the button.

The seal 2 will conventionally be made of any material enabling the required level of seal to be achieved, notably rubber, elastomer or other material of the same type.

Referring to FIGS. 4A to 4F, the seal 2 includes two parts, a first part 20 and a second part 21.

The first part 20 of the seal takes the form of a belt defining two opposite faces, an internal face 200 intended to be in contact with the body of the element and an opposite external face 201. This first part 20 is intended to come to surround the body of the button.

The second part 21 of the seal is intended to provide the seal around the opening formed through the wall. It takes the form of a flat ring surmounting the first part 20 and thus forming a flange. It therefore includes a first face, termed the upper face 210, and a second face, termed the lower face 211.

The second part 21 also includes two edges, a first edge termed the upper edge 212 and a second edge termed the lower edge 213. The upper edge is formed as a projection on the upper face 210 and the lower edge is formed as a projection on the lower face 211.

The upper edge 212 and the lower edge 213 also follow a closed annular path on their respective face.

During installation, the upper edge 212 is intended to come into contact with the shoulder 12 formed by the flange 11 of the human-machine dialogue element and the lower edge 213 is intended to come into contact with the front face of the wall, over all the periphery of the opening (FIG. 1B).

The first part 20 of the seal 2 includes one or more positioning elements enabling provision of functions for positioning, self-centering and self-retention of the seal on the body 10 of the human-machine dialogue element. Each element in particular enables the seal to be correctly positioned on the element and to be prevented from rotating about the main axis (X) after it has been installed.

A positioning element may include a hollow 202 or a notch provided on the internal face 200 of the first part of the seal, thus forming a protuberance 203 on the external face 201 of this first part. The hollow 202 is intended to cooperate with a corresponding lug formed on the body of the human-machine dialogue element.

Another positioning element may include a cut-out 214 produced through the flat ring of the second part 21 of the seal 2 and intended to cooperate with a lug 120 produced on the shoulder 12 formed by the flange 11 of the man-machine dialogue element relative to the body 10.

A plurality of positioning elements of this type or of equivalent shape may be produced on the seal. They are intended to cooperate with corresponding shapes produced on the human-machine dialogue element.

According to one particular aspect of the invention, the lower edge 213 has a path that includes a plurality of chicanes, so as to have concave parts 30 and convex parts 40. Each concave part 30 is oriented inward relative to the main axis and each convex part 40 is offset outward relative to the main axis. Each concave part 30 therefore enables delimitation of an extended zone on the lower face 211 of the second part of the seal. Each convex part 40 is shaped so as to circumvent a protuberance 203 of a positioning element.

The zone delimited by a concave part 30 forms a bearing land 31 intended for the attachment of an identification device.

The upper edge 212 may also include a plurality of chicanes so as to circumvent each protuberance 203 formed by at least one positioning element.

Thanks to the chicanes, the seal is provided as close as possible to the body of the human-machine dialogue element around the axis, so as to concentrate the seal in as small a zone as possible, whilst enabling account to be taken of the particular configuration of the seal.

The two edges 212, 213 may be produced one above the other, so as to follow an identical path.

The seal 2 is made and positioned on the body of the human-machine dialogue element so that the exterior edge of its second part 20 is vertically aligned with the external edge of the flange 11 of the human-machine dialogue element.

Figure 3A:
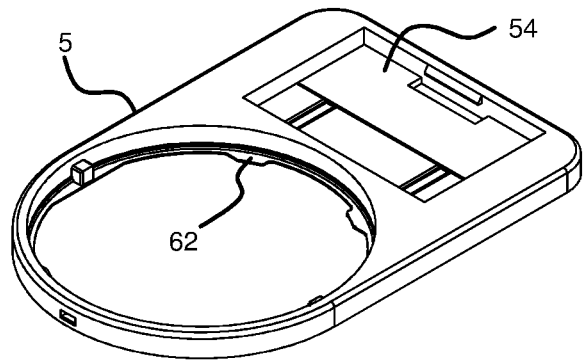
FIGS. 3A to 3C show an identification device intended to cooperate with the sealing device of the invention, respectively in perspective and assembled, in exploded view seen from above, in exploded view seen from below.
Figure 3B:
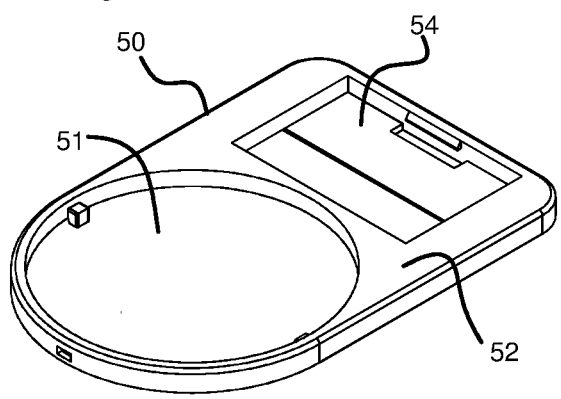
Figure 3C:
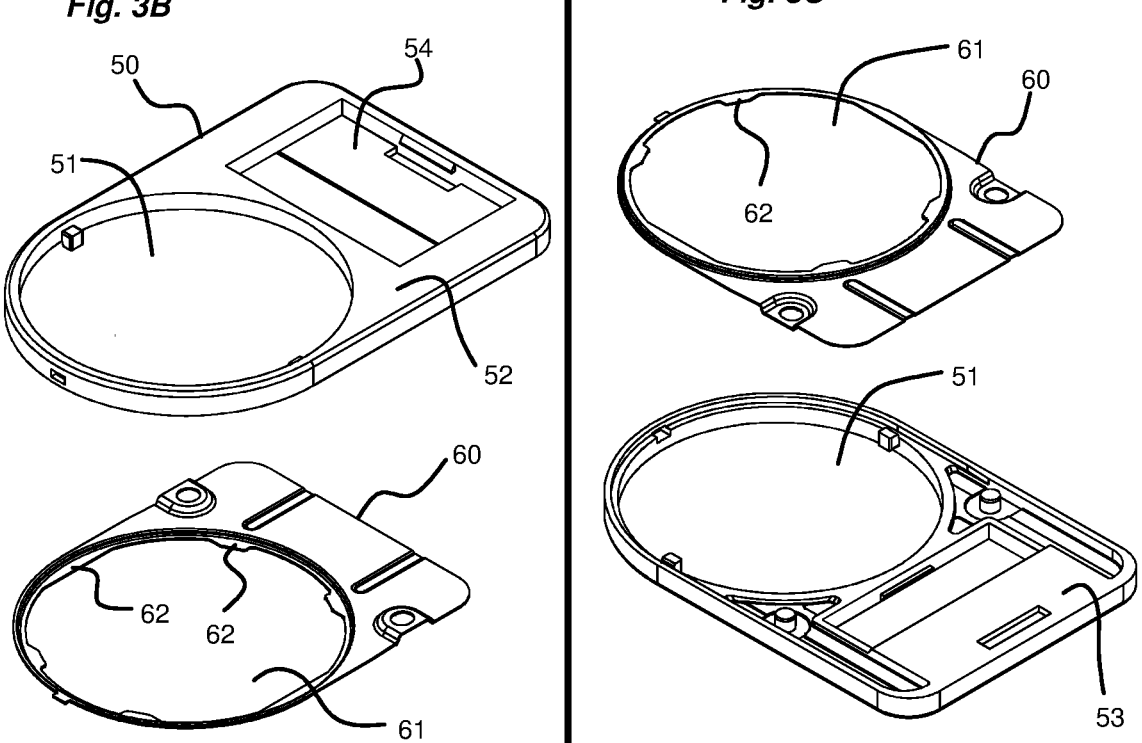
Figure 4A:
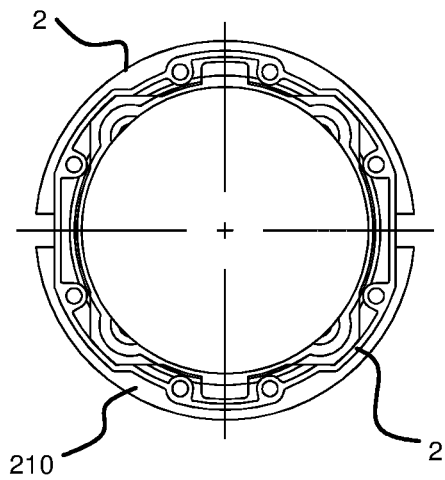
FIGS. 4A to 4F show the seal of the sealing device of the invention, respectively from above, from the side, from below, partially in perspective from above, partially in perspective from below, partially in perspective from below.
Figure 4B:
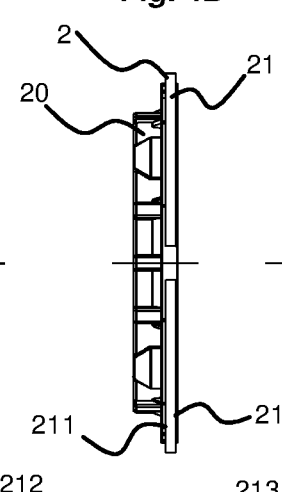
Figure 4C:
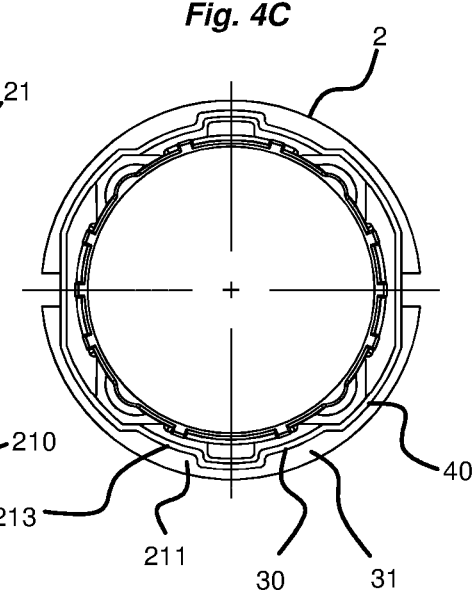
Figure 4D:
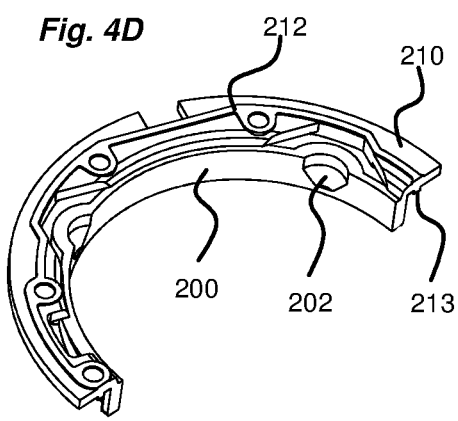
Figure 4E:
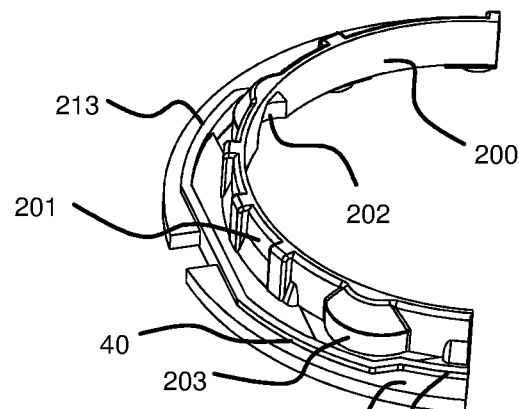
Figure 4F:
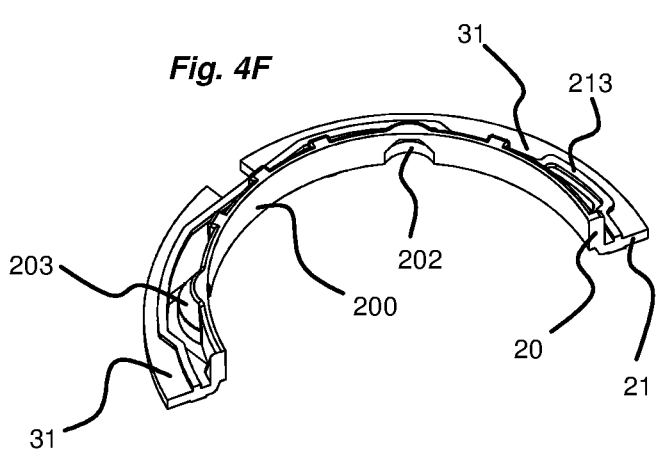

The human-machine dialogue assembly is also adapted to include an identification device 5 as shown in FIGS. 3A to 3C. An identification device 5 of this kind is in particular intended to identify the human-machine dialogue element to which it is fitted.

According to one aspect of the invention, the identification device 5 includes a casing 50. The casing 50 includes an opening 51 with sufficient dimensions to espouse the external shape of the flange of the human-machine dialogue element. This casing may have a thickness equivalent to or even identical to the height of the flange of the human-machine dialogue element.

The casing 50 may be made of plastic material.

The casing has a front face 52 and a rear face 53. The front face may include a housing 54 intended to receive an identification label indicating the function of the associated human-machine dialogue element or other information.

The identification device includes a plate 60 intended to be assembled to said casing 50. This plate 60 comes to be fixed to the casing, to cover at least partly the rear face 53 of the latter. The assembly may be made by any known solution, for example peening or overmoulding. The plate 60 may be of pressed stainless steel sheet or using equivalent material and process. The plate serves as a support for fixing the identification device.

The plate 60 also includes a routed opening 61 with dimensions equivalent to those of the casing 50, this opening 61 coming to face that in the casing of the device. The plate 60 also includes one or more attachment tongues 62 produced on the perimeter of the opening 61, each tongue 62 extending inward, in the direction of the main axis (X). Each tongue 62 is positioned so as to come to bear on a bearing land 31 of the seal. The identification device can thus be fixed relative to the human-machine dialogue element by the tongues 62 gripped between the lower face 211 of the second part 21 of the seal and the wall P.

There may be six tongues 62.

The thickness of each tongue 62 (in the direction of the axis (X)) is less than the height of the lower edge 213, which enables preservation of a certain level of compression of the seal during assembly.

An identification device of this kind may additionally or instead also carry luminous signalling functions but also wireless data transmission/reception functions or any other function of this type. It may notably integrate an electronic circuit card housed in its casing closed by the plate.

In a nonlimiting manner, the human-machine dialogue assembly could have the following dimensions:
thickness of the plate 0.2 mm;
height of the upper edge 0.15 mm;
height of the lower edge 0.4 mm;
height of the flange of the human-machine dialogue element in a flush version equal to 3 mm.

During assembly with no identification device, the upper edge 212 and the lower edge 213 are compressed up to a mechanical abutment provided on the human-machine dialogue element, this abutment being positioned to fix the height of the human-machine dialogue element in front of the wall at a given height (3 mm for a flush version as in the appended figures).

During assembly with an identification device as described hereinabove, the tongues 62 come to press against the lower face 211 of the second part 21 of the seal over the bearing zones delimited by the chicanes. The upper edge remains identically compressed but the compression of the lower edge is limited to the level of the bearing zones 31 of the tongues 62 of the plate 60 of the identification device. Outside these zones, the compression of the seal may be continued as far as the mechanical abutment provided on the human-machine dialogue element.

Moreover, it must be noted that the upper edge 212 and the lower edge 213 in particular serve to compensate irregularities in the flatness of the rear face of the wall P. They also have the function of limiting the tightening torque necessary to fix the human-machine dialogue element to the wall P.

It is clear from the foregoing description that the solution of the invention has a certain number of advantages, including:
a multipurpose sealing solution, the latter being similar in architecture whether with or without an identification device;
possibility of obtaining a strong IP69 seal, even with the identification device present;
easy assembly and installation;
a solution that does not necessitate the presence of a clearance between the seal and the flange of the human-machine dialogue element to fix the identification device, the latter being attached simply thanks to the tongues;
a sealing solution and a solution accommodating the identification device that do not lead to any overthickness, enabling preservation of a small overall size in the heightwise direction in front of the wall and therefore proposing a flush version of limited height (of only 3 mm for example).

The invention claimed is:

1. A sealing device for a human-machine dialogue element adapted to be fixed through a wall, said device comprising a seal formed in a ring around an axis, said seal comprising:
a first annular part comprising at least one positioning element of the seal adapted to cooperate with said human-machine dialogue element to limit a rotation of the seal about said axis, and
a sealing second annular part comprising a first face and a second face,
wherein:
the seal includes a first annular edge formed around said axis projecting from said first face and a second annular edge formed around said axis projecting from said second face, and the second annular edge follows a path including a plurality of chicanes so as to form at least one concave part delimiting a bearing zone on said second face and at least one convex part delimiting a first disengagement zone on said second face to circumvent said at least one positioning element.

2. The device according to claim 1, wherein said first annular part takes the form of a belt and in that said sealing second annular part forms a flange around said belt.

3. The device according to claim 2, wherein said belt comprises an internal first face and an external second face, and wherein said at least one positioning element comprises a hollow formed in said internal first face forming a protuberance on said external second face.

4. The device according to claim 1, wherein the first annular edge comprises at least one chicane delimiting a second disengagement zone on said first face to circumvent said at least one positioning element.

5. A human-machine dialogue assembly, comprising the human-machine dialogue element provided with a tubular body surmounted by a flange, and the sealing device as defined in claim 1, said seal being adapted to surround said tubular body of the human-machine dialogue element with said first annular part and to bear against the flange through said first annular edge.

6. The assembly according to claim 5, further comprising an identification device comprising at least one tongue adapted to bear on said bearing zone of the first face.

7. The assembly according to claim 6, wherein the identification device comprises a first part having an opening arranged at a periphery of said flange of the human-machine dialogue element and a second part carrying said at least one tongue.

8. The assembly according to claim 7, wherein the first part of the identification device comprises a housing adapted to receive an identification label.

9. The assembly according to claim 7, wherein the first part of the identification device comprises a casing, and wherein the second part comprises a plate assembled onto said casing.

10. The assembly according to claim 9, wherein the plate comprises a routed opening on an edge of which is formed said at least one tongue.

11. The assembly according to claim 9, wherein the casing and the plate are assembled together by peening or overmoulding.

* * * * *